United States Patent
Zhamu et al.

(10) Patent No.: US 12,060,273 B2
(45) Date of Patent: Aug. 13, 2024

(54) PRODUCTION OF GRAPHITIC FILMS FROM A MIXTURE OF GRAPHENE OXIDE AND HIGHLY AROMATIC MOLECULES

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 16/854,368

(22) Filed: Apr. 21, 2020

(65) Prior Publication Data

US 2021/0323829 A1 Oct. 21, 2021

(51) Int. Cl.
*C01B 32/198* (2017.01)
*B05D 1/02* (2006.01)

(52) U.S. Cl.
CPC .............. *C01B 32/198* (2017.08); *B05D 1/02* (2013.01); *B05D 2203/35* (2013.01)

(58) Field of Classification Search
None
See application file for complete search history.

(56) References Cited

U.S. PATENT DOCUMENTS

| | | |
|---|---|---|
| 3,656,904 A | 4/1972 | Ram |
| 4,017,673 A | 4/1977 | Michels et al. |
| 5,449,507 A | 9/1995 | Murakami et al. |
| 7,071,258 B1 | 7/2006 | Jang et al. |
| 7,758,842 B2 | 7/2010 | Nishikawa et al. |
| 7,948,739 B2 | 5/2011 | Zhamu et al. |
| 8,105,565 B2 * | 1/2012 | Nishikawa .............. C01B 32/20 423/448 |
| 9,809,459 B2 * | 11/2017 | Zhamu .................. C01B 32/194 |
| 2005/0127334 A1 | 6/2005 | Shibata et al. |
| 2005/0271574 A1 | 12/2005 | Jang et al. |
| 2006/0035085 A1 | 2/2006 | Ozaki et al. |
| 2007/0013094 A1 | 1/2007 | Bischofsberger et al. |
| 2008/0014426 A1 | 1/2008 | Nishikawa et al. |

(Continued)

OTHER PUBLICATIONS

U.S. Appl. No. 14/121,387 Final Office Action dated Aug. 8, 2019, 8 pages.

(Continued)

*Primary Examiner* — Michael P. Rodriguez

(57) ABSTRACT

Provided is a method of producing a graphitic film, comprising: (a) providing a suspension of a mixture of graphene oxide (GO) and aromatic molecules selected from petroleum heavy oil or pitch, coal tar pitch, a polynuclear hydrocarbon, a halogenated variant thereof, or a combination thereof, dispersed or dissolved in a liquid medium; (b) dispensing and depositing the suspension onto a surface of a supporting substrate to form a wet layer, wherein the procedure includes subjecting the suspension to an orientation-inducing stress or strain; (c) partially or completely removing the liquid medium; and (d) heat treating the resulting dried layer at a first temperature selected from 20° C. to 3,200° C. so that the GO and aromatic molecules are cross-linked, merged or fused into larger aromatic molecules to form the graphitic film, wherein the larger aromatic molecules or graphene planes in the graphitic film are substantially parallel to each other.

18 Claims, 4 Drawing Sheets

(56) References Cited

U.S. PATENT DOCUMENTS

| | | |
|---|---|---|
| 2008/0048152 A1 | 2/2008 | Jang et al. |
| 2008/0206484 A1* | 8/2008 | Kostecki ............ C23C 16/26 427/595 |
| 2008/0248275 A1 | 10/2008 | Jang et al. |
| 2009/0068471 A1 | 3/2009 | Choi et al. |
| 2009/0220793 A1 | 9/2009 | Shimoyama et al. |
| 2010/0062220 A1 | 3/2010 | Nishikawa |
| 2010/0085713 A1 | 4/2010 | Balandin et al. |
| 2010/0140792 A1 | 6/2010 | Haddon et al. |
| 2011/0108978 A1 | 5/2011 | Kim et al. |
| 2011/0243830 A1 | 10/2011 | Ozaki et al. |
| 2013/0329366 A1 | 12/2013 | Wang et al. |
| 2014/0065399 A1 | 3/2014 | Weng et al. |
| 2015/0266739 A1* | 9/2015 | Zhamu ............ C01B 32/182 428/408 |
| 2019/0077668 A1* | 3/2019 | Zhamu ............ C01B 32/184 |
| 2019/0077669 A1* | 3/2019 | Zhamu ............ C01B 32/192 |

OTHER PUBLICATIONS

U.S. Appl. No. 14/121,387 Final Office Action dated Jun. 15, 2018, 11 pages.
U.S. Appl. No. 14/121,387 Nonfinal Office Action dated Feb. 25, 2019, 10 pages.
U.S. Appl. No. 14/121,387 Nonfinal Office Action dated Jan. 27, 2020, 8 pages.
U.S. Appl. No. 14/121,387 Nonfinal Office Action dated Nov. 17, 2017, 8 pages.

* cited by examiner

PRODUCTION OF GRAPHITIC FILMS FROM A MIXTURE OF GRAPHENE OXIDE AND HIGHLY AROMATIC MOLECULES

The present disclosure relates to the art of graphitic materials and, in particular, to a method of rapidly producing a graphitic film from a mixture of graphene oxide and aromatic hydrocarbon molecules.

BACKGROUND

Advanced EMI shielding and thermal management materials are becoming more and more critical for today's microelectronic, photonic, and photovoltaic systems. These systems require shielding against EMI from external sources. These systems can be sources of electromagnetic interference to other sensitive electronic devices and, hence, must be shielded. Materials for EMI shielding applications must be electrically conducting.

Further, as new and more powerful chip designs and light-emitting diode (LED) systems are introduced, they consume more power and generate more heat. This has made thermal management a crucial issue in today's high performance systems. Systems ranging from active electronically scanned radar arrays, web servers, large battery packs for personal consumer electronics or electric vehicles (EVs), wide-screen displays, and solid-state lighting devices all require high thermal conductivity materials that can dissipate heat more efficiently. Furthermore, many microelectronic devices (e.g. smart phones, flat-screen TVs, tablets, and laptop computers) are designed and fabricated to become increasingly smaller, thinner, lighter, and tighter. This further increases the difficulty of thermal dissipation. Actually, thermal management challenges are now widely recognized as the key barriers to industry's ability to provide continued improvements in device and system performance.

Heat sinks are components that facilitate heat dissipation from the surface of a heat source, such as a CPU or battery in a computing device, to a cooler environment, such as ambient air. Typically, heat transfer between a solid surface and the air is the least efficient within the system, and the solid-air interface thus represents the greatest barrier for heat dissipation. A heat sink is designed to enhance the heat transfer efficiency between a heat source and the air mainly through increased heat sink surface area that is in direct contact with the air. This design enables a faster heat dissipation rate and thus lowers the device operating temperature.

Materials for thermal management applications (e.g. as a heat sink or heat spreader) must be thermally conducting. Typically, heat sinks are made from a metal, especially copper or aluminum, due to the ability of metal to readily transfer heat across its entire structure. Cu and Al heat sinks are formed with fins or other structures to increase the surface area of the heat sink, often with air being forced across or through the fins to facilitate dissipation of heat to the air. However, there are several major drawbacks or limitations associated with the use of metallic heat sinks. One drawback relates to the relatively low thermal conductivity of a metal (<400 W/mK for Cu and 80-200 W/mK for Al alloy). In addition, the use of copper or aluminum heat sinks can present a problem because of the weight of the metal, particularly when the heating area is significantly smaller than that of the heat sink. For instance, pure copper weighs 8.96 grams per cubic centimeter (g/cm$^3$) and pure aluminum weighs 2.70 g/cm$^3$. In many applications, several heat sinks need to be arrayed on a circuit board to dissipate heat from a variety of components on the board. If metallic heat sinks are employed, the sheer weight of the metal on the board can increase the chances of the board cracking or of other undesirable effects, and increases the weight of the component itself. Many metals do not exhibit a high surface thermal emissivity and thus do not effectively dissipate heat through the radiation mechanism.

Thus, there is a strong need for a non-metallic heat sink system effective for dissipating heat produced by a heat source such as a CPU and battery in a device. The heat dissipating and heat sink system should exhibit a higher thermal conductivity and/or a higher thermal conductivity-to-weight ratio as compared to metallic heat sinks. These heat sinks must also be mass-producible, preferably using a cost-effective process. This processing ease requirement is important since metallic heat sinks can be readily produced in large quantities using scalable techniques such as extrusion, stamping, and die casting.

One group of materials potentially suitable for both EMI shielding and heat dissipation applications is the graphitic carbon or graphite. Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material.

Bulk natural graphite powder is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another. This presents a problem as explained below:

A graphite single crystal (crystallite) per se or a crystalline grain in a graphite particle is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Furthermore, there are large amounts of highly deficient boundaries between grains that impede the movement of electrons and phonons (quantized lattice vibrations), the two heat conduction mechanisms according to quantum mechanics. Consequently, a natural graphite particle composed of multiple grains of different orientations with highly defected grain boundaries exhibits an average property between these two extremes. This average conductivity, typically less than 200 W/mK, is insufficient for microelectronic device heat dissipation applications.

One approach to overcoming this problem is to make use of flexible graphite foil. The flexible graphite foil is obtained by the following typical steps: (a) intercalating particles of natural graphite with an intercalant (e.g. mixture of sulfuric acid and nitric acid) to form a graphite intercalation compound (GIC); (b) exposing the GIC to a thermal shock treatment (typically 650°-1,100° C.) to produce exfoliated graphite (also referred to as graphite worms); and then (c) compressing or roll-pressing exfoliated graphite worms into paper-like sheets or foil. Details are given in a later section. For electronic device thermal management applications (e.g. as a heat sink material in a smart phone), flexible graphite (FG) foils have the following major deficiencies:

(1) As indicated earlier, FG foils exhibit a relatively low thermal conductivity, typically <500 W/mK and more typically <300 W/mK. By impregnating the exfoliated graphite with a resin, the resulting composite exhibits an even lower thermal conductivity (typically <<200 W/mK, more typically <100 W/mK).

(2) Flexible graphite foils, without a resin impregnated therein or coated thereon, are of low strength, low rigidity, and poor structural integrity. The high tendency for flexible graphite foils to get torn apart makes them difficult to handle in the process of making a heat sink. As a matter of fact, the flexible graphite sheets (typically 50-200 μm thick) are so "flexible" that they are not sufficiently rigid to make a fin component material for a finned heat sink.

(3) Another very subtle, largely ignored or overlooked, but critically important feature of FG foils is their high tendency to get flaky with graphite flakes easily coming off from FG sheet surfaces and emitting out to other parts of a microelectronic device. These highly electrically conducting flakes (typically 1-200 μm in lateral dimensions and >100 nm in thickness) can cause internal shorting and failure of electronic devices.

A new class of nano carbon material is graphene, a 2-D material having a hexagonal arrangement of carbon atoms. These honeycomb-like carbon atoms can form a free standing sheet that is one-atom thick, which is now commonly referred to as a single-layer graphene sheet. Several layers of graphene planes can be bonded together to form a multi-layer graphene sheet or platelets, which contain less than 300 graphene planes or layers (or thinner than 100 nm), preferably less than 20 layers, and further preferably less than 10 layers (few-layer graphene). In both single-layer graphene and multi-layer graphene sheets, the graphene planes or edges can contain some non-carbon elements, such as hydrogen, oxygen, nitrogen, and fluorine, to name just a few. All these single-layer or multi-layer graphene sheets (0.24 nm to 100 nm thick) are herein collectively referred to as nano graphene platelets (NGPs). This is further discussed in a later section.

Multiple sheets of a graphene material (e.g. discrete nano sheets/platelets of pristine graphene, graphene oxide, reduced graphene oxide, graphene fluoride, nitrogenated graphene, hydrogenated graphene, boron-doped graphene, etc.) can be packed into a film, membrane, or paper sheet. These aggregates typically do not exhibit a high thermal conductivity unless these sheets/platelets are closely packed and the film/membrane/paper is ultra-thin (e.g. <1 μm, which is mechanically weak). In general, a paper-like structure or mat made from platelets of graphene, graphene oxide (GO), or reduced graphene oxide (RGO) (e.g. those paper sheets prepared by vacuum-assisted filtration process) exhibit many defects, wrinkled or folded graphene sheets, interruptions or gaps between platelets, and non-parallel platelets, leading to relatively poor thermal conductivity, low electric conductivity, and low structural strength. These papers or aggregates of discrete graphene, GO or RGO platelets alone (without a resin binder) also have a tendency to get flaky, emitting conductive particles into air.

Another prior art material for thermal management or EMI shielding application is the pyrolitic graphite film produced from a thermally stable polymer, such as polyimide (PI). The process begins with carbonizing a polymer film at a carbonization temperature of typically 400-1,500° C. under a typical pressure of 10-15 Kg/cm$^2$ for 6-36 hours to obtain a carbonized film, which is followed by a graphitization treatment at 2,500-3,200° C. under an ultrahigh pressure of 100-300 Kg/cm$^2$ for 5-36 hours, depending upon the graphitization temperature used to form a graphitic film. There are several major drawbacks associated with this process for producing graphitic films:

(1) Synthesis of thermally stable polymers has been a challenging process that typically begins with synthesis of monomers, which are themselves expensive. This is a difficult, slow, tedious, energy-intensive, and very expensive process.

(2) Technically, it is utmost challenging to maintain such an ultrahigh pressure (>100 Kg/cm$^2$) at such an ultrahigh temperature (>2,500° C.) during the carbonization and graphitization procedures. The combined high temperature and high pressure conditions, even if achievable, are not cost-effective.

(3) This polymer carbonization and graphitization process typically is not conducive to the production of either thick graphitic films (>50 μm) or very thin films (<10 μm).

(4) In general, high-quality graphitic films could not be produced with a final graphitization temperature lower than 2,700° C., unless when a highly oriented polymer is used as a starting material, which is carbonized for an extended period of time prior to graphitization (e.g. please see Y. Nishikawa, et al. "Filmy graphite and process for producing the same," U.S. Pat. No. 7,758,842 (Jul. 20, 2010)) or a catalytic metal is brought in contact with a highly oriented polymer during carbonization and graphitization (Y. Nishikawa, et al. "Process for producing graphite film," U.S. Pat. No. 8,105,565 (Jan. 31, 2012)). This high degree of molecular orientation, as expressed in terms of optical birefringence, is not always possible to achieve with polymers. Further, the use of a catalytic metal tends to contaminate the resulting graphite films with metallic elements. Furthermore, the total heat treatment times (carbonization and graphitization combined) are too long and the amount of energy consumed is too high.

(5) The resulting graphitic films tend to be brittle and of low mechanical strength.

Thus, it is an object of the present disclosure to provide a process for producing graphitic films that exhibit a combination of exceptional thermal conductivity, electrical conductivity, and mechanical strength unmatched by any material of comparable thickness range.

SUMMARY

The present disclosure provides a simple, scalable, and cost-effective process or method that meets the afore-mentioned needs. This method is capable of producing a graphitic film from a mixture of graphene oxide and a precursor to carbon or graphite (referred to as a carbon/graphite precursor), including highly aromatic molecules or polycyclic aromatic hydrocarbons (PAH).

In certain embodiments, the disclosure provides a method of producing a graphitic film having a thickness from 2 nm to 5 mm (preferably and typically from 10 nm to 500 µm and further preferably from 100 nm to 200 µm), the method comprising:
 a) providing a suspension of both graphene oxide (GO) and aromatic molecules dispersed or dissolved in a liquid medium, wherein, wherein the GO-to-aromatic molecule weight ratio is from 1/100 to 100/1 and the aromatic molecules are selected from petroleum heavy oil or pitch, coal tar pitch, a polynuclear hydrocarbon, a halogenated variant thereof, or a combination thereof and wherein said aromatic molecules, containing a plane of hexagonal carbon atoms or fused aromatic rings (typically, have an initial length or width from 5 nm to 1 µm);
 b) dispensing and depositing the suspension onto a surface of a supporting substrate to form a wet layer of GO and aromatic molecules, wherein the dispensing and depositing procedure includes subjecting the suspension to an orientation-inducing stress or strain;
 c) partially or completely removing the liquid medium from the wet layer to form a dried layer of GO and aromatic molecules; and
 d) heat treating the dried layer of aromatic molecules at a first temperature selected from 25° C. to 3,000° C. so that the aromatic molecules are cross-linked (e.g. between GO sheets), merged or fused (e.g. edge-to-edge) into larger graphene sheets and/or aromatic molecules, larger than the initial length or width, to form the graphitic film having graphene domains or graphite crystals, wherein the larger aromatic molecules or graphene planes in the graphene domains or graphite crystals are substantially parallel to each other.

Preferably, graphene oxide comprises an oxygen content from 2% to 50% (more preferably from 5% to 30%) by weight of the total graphene oxide weight.

It may be noted that, preferably and typically, the suspension provided in operation (a) does not include the formation of a meso-phase sphere or the meso-carbon micro-beads (MCMB). The preparation of such a suspension may include operating mechanical or chemical mechanisms to disrupt or interrupt the incipient formation of MCMBs. This MCMB production process is illustrated in FIG. 2. The presence of these meso-phase spheres or meso-carbon beads are not conducive to aligning the aromatic molecules to form a preferred orientation of the wet film, dried film, and final graphitic film.

In the method, the liquid medium may comprise a disordered matrix of carbon or hydrocarbon molecules. In some embodiments, the graphene domains or graphite crystals have a length or width from 10 nm to 10 µm or an inter-graphene spacing from 0.34 nm to 2.2 nm.

The polynuclear hydrocarbon is preferably selected from naphthalene, anthracene, phenanthrene, tetracene, chrysene, triphenylene, pyrene, pentacene, benzo-pyrene, corannulene, benzo-perylene, coronene, ovalene, benzo-fluorene, a halogenated version thereof, a derivative thereof having a substituent on a ring structure thereof, a chemical derivative thereof, or a combination thereof.

In some embodiments, the aromatic molecules are selected from 1-pyrenebutyrate, pyrene-1-sulfonic acid, 3, 4, 9, 10-perylenetetracarboxylic diimide bis-benzenesulfonic acid, a polymer or long molecule with both ends terminated with phenyl, pyrene, or di-pyrene moieties, or a combination thereof.

In some embodiments, heat treating is conducted after the film of aromatic molecules is produced; such a film contains the highly aligned (oriented) graphene oxide sheets (or GO molecules) and aromatic molecules that are close to one another and are substantially parallel to one another. Such a preferred molecular orientation or alignment enables the aromatic molecules, when being heat-treated at a first temperature selected from 20° C. to 3,000° C., to be chemically cross-linked, merged or fused into larger (i.e. longer and wider) aromatic molecules or graphene planes.

As the heat treatment proceeds or is conducted at a higher temperature, these larger aromatic molecules or graphene planes in GO not only grow in size (becoming longer and wider via merging or linking) but also can form graphene domains (also aligned to be parallel to each other) dispersed in a disordered matrix of carbon or hydrocarbon molecules. The graphene domains are each composed of from 1 to 100 planes (more typically <30 planes) of hexagonal carbon atoms or fused aromatic rings having a length or width from 4 nm to 100 µm (more typically from 5 nm to 35 µm and further more typically from 10 nm to 10 µm) and, in the situations wherein there are 2 or more planes in a graphene domain, an inter-graphene space between two planes of hexagonal carbon atoms or fused aromatic rings can be reduced to less than 0.4 nm.

Aromatic graphene molecules may contain halogen selected from F, Cl, Br, I, or a combination thereof. The halogen atoms in the halogenated aromatic molecules are preferably attached to a carbon atom at the edge of a fused benzene ring-type structure. The halogen atoms are preferably not part of the fused benzene ring structure.

Preferably, the polynuclear hydrocarbon may contain halogenated polynuclear hydrocarbon selected from halogenated versions of naphthalene, anthracene, phenanthrene, tetracene, chrysene, triphenylene, pyrene, pentacene, benzo-pyrene, corannulene, benzo-perylene, coronene, ovalene, benzo-fluorene, a derivative thereof having a substituent on a ring structure thereof, a chemical derivative thereof, or a combination thereof.

The halogenation of aromatic molecules is well known in the art. For instance, halogenation of anthracene may be accomplished by following the approaches proposed by Duan, et a. [Duan, Turk, Speigle, Corbin, Masnovi and Baker, Halogenations of Anthracenes and Dibenz[a,c]anthracene with N-Bromosuccinimide and N-Chlorosuccinimide, The Journal of Organic Chemistry, 2000 65 (10), pp 3005-3009]. For instance,

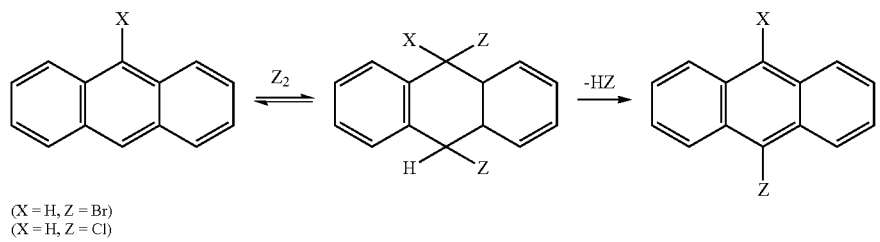

(X = H, Z = Br)
(X = H, Z = Cl)

The GO and/or aromatic molecules, prior to operation (a) or (b), may be preferably attached with some desired functional groups that facilitate or promote edge-to-edge chemical merging or linking between molecules during operation (d) of heat-treating. In some embodiments, aromatic molecules recited in operation (a) are chemically functionalized with a functional group selected from —OH, —COOH, —NH$_2$, —C═O, or a combination thereof.

In some embodiments, the functional group attached to the GO and/or aromatic molecules prior to operation (a) or (b) may be selected from alkyl or aryl silane, alkyl or aralkyl group, hydroxyl group, carboxyl group, amine group, sulfonate group (—SO$_3$H), aldehydic group, quinoidal, fluorocarbon, or a combination thereof.

In certain embodiments, the functional group attached to the GO and/or aromatic molecules prior to operation (a) or (b) may contain an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

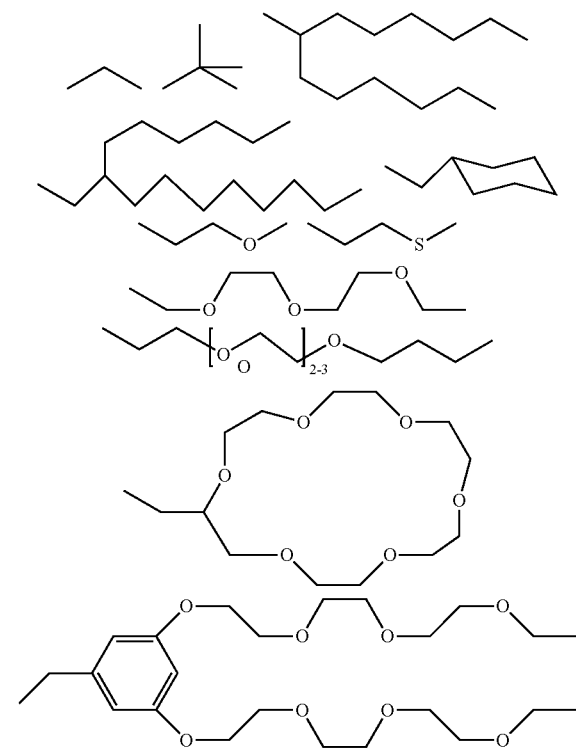

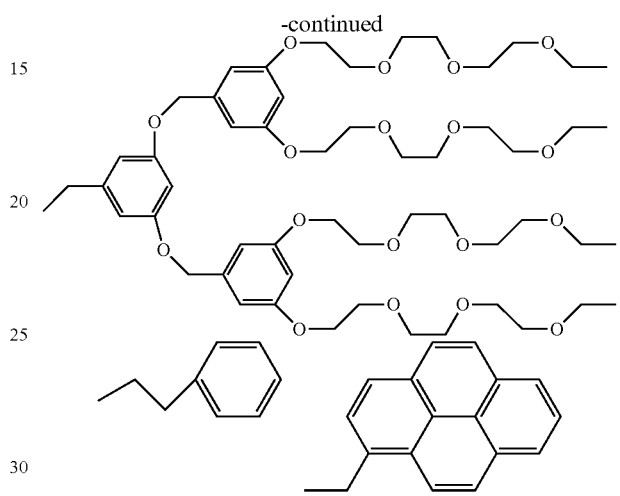

and combinations thereof.

In certain embodiments, the functional group attached to the GO and/or aromatic molecules prior to operation (a) or (b) may contain an oxygenated group selected from the group consisting of hydroxyl, peroxide, ether, keto, and aldehyde. In certain embodiments, the functionalizing agent contains a functional group selected from the group consisting of SO$_3$H, COOH, NH$_2$, OH, R'CHOH, CHO, CN, COCl, halide, COSH, SH, COOR', SR', SiR'$_3$, Si(—OR'—)$_y$R'$_3$-y, Si(—O—SiR'$_2$—)OR', R", Li, AlR'$_2$, Hg—X, T1Z$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

In some embodiments, the functional group attached to the GO and/or aromatic molecules prior to operation (a) or (b) may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof. The functionalizing agent may contain an acrylonitrile chain, polyfurfuryl alcohol, phenolic resin, or a combination thereof.

In some embodiments, the functional group is selected from OY, NHY, O═C—OY, P═C—NR'Y, O═C—SY, O═C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

In certain embodiments, the suspension in operation (a) may contain a catalyst that promotes the chemical linking between aromatic molecules and between GO and aromatic molecules and facilitates the formation of graphene domains or graphite single crystals during the heat treatment. Preferably, the catalyst contains a transition metal selected from Ti, V, Cr, Mn, Fe, Co, Ni, Cu, Zn, Zr, Nb, Mo, Ru, Pd, Ag, Cd, Pt, Au, or a combination thereof. In some embodiments, the catalyst contains a chemical species selected from PdCl$_2$, FeCl$_3$, FeBr$_3$, FeF$_3$, NiBr$_2$, NiI$_2$, Cs$_2$CO$_3$, CsF, CsCl, CsBr, CH$_2$CL$_2$, or a combination thereof.

In certain embodiments, the method further comprises compressing the graphitic film (during operation (c), operation (d) and/or after operation (d)) to produce a highly conducting graphitic film having a physical density no less than 1.6 g/cm$^3$. Preferably, operation (d) of heat treating the dried layer of aromatic molecules is conducted while a compressive stress is imposed on the dried layer.

In some embodiments, the suspension contains the GO and aromatic molecules in an amount sufficient to form a liquid crystal phase in the liquid medium.

In some embodiments, the liquid medium contains a non-aqueous solvent selected from polyethylene glycol, ethylene glycol, propylene glycol, an alcohol, a sugar alcohol, a polyglycerol, a glycol ether, an amine based solvent, an amide based solvent, an alkylene carbonate, an organic acid, or an inorganic acid.

Preferably, operations (b), (c) and (d) are conducted in a roll-to-roll manner and the process is a continuous, reel-to-reel process.

In some embodiments, the first heat treatment temperature contains a temperature in the range from 20° C.-1,500° C. and the graphitic film has an oxygen content less than 2.0%, an inter-planar spacing less than 0.36 nm, a physical density no less than 1.5 g/cm$^3$, a thermal conductivity of at least 700 W/mK, and/or an electrical conductivity no less than 1,300 S/cm.

In some embodiments, the first heat treatment temperature contains a temperature in the range from 1,500° C.-2,100° C. and the graphitic film has an oxygen content less than 1.0%, an inter-planar spacing less than 0.345 nm, a thermal conductivity of at least 1,000 W/mK, and/or an electrical conductivity no less than 5,000 S/cm.

In some embodiments, the first heat treatment temperature contains a temperature greater than 2,100° C. and the graphitic film has an oxygen content no greater than 0.1%, an inter-graphene spacing less than 0.340 nm, a mosaic spread value no greater than 0.7, a thermal conductivity of at least 1,300 W/mK, and/or an electrical conductivity no less than 8,000 S/cm.

In some embodiments, the first heat treatment temperature contains a temperature no less than 2,500° C. and the highly graphitic film has an inter-graphene spacing less than 0.336 nm, a mosaic spread value no greater than 0.4, a thermal conductivity greater than 1,600 W/mK, and/or an electrical conductivity greater than 10,000 S/cm.

In some embodiments, the graphitic film exhibits a degree of graphitization no less than 80% and/or a mosaic spread value less than 0.4.

In certain embodiments, the method further includes heat-treating the graphene domains at a second temperature selected from 300° C. to 3,200° C. for at least 0.5 hours prior to the next operation. This is more typically from 1 to 96 hours, but still more typically from 2 to 48 hours.

The present disclosure also provides a graphitic film, preferably having a thickness from 2 nm to 5 mm, wherein the graphitic film comprises graphene sheets that are cross-linked by molecules of a polynuclear hydrocarbon selected from naphthalene, anthracene, phenanthrene, tetracene, chrysene, triphenylene, pyrene, pentacene, benzo-pyrene, corannulene, benzo-perylene, coronene, ovalene, benzo-fluorene, a derivative thereof having a substituent on a ring structure thereof, a chemical derivative thereof, or a combination thereof and the graphene sheets are substantially parallel to each other.

In the graphitic film, the graphene sheets preferably comprise graphene molecules selected from graphene oxide, reduced graphene oxide, halogenated graphene, nitrogenated graphene, hydrogenated graphene, chemically functionalized graphene, or a combination thereof.

In the graphitic film, the graphene sheets preferably comprise a functional group selected from —OH, —COOH, —NH$_2$, —C=O, or a combination thereof, which is attached to an edge or surface of a graphene plane.

Preferably, the graphitic film is in a roll form having a width no less than 5 cm (typically from 5 cm to 150 cm wide) and a length no less than 100 cm (practically up to 5 km). Such a roll of film is produced by a roll-to-roll or reel-to-reel process.

DETAILED DESCRIPTION OF PREFERRED EMBODIMENTS

As discussed in the Background section, a pyrolitic graphite film may be produced from a thermally stable polymer, such as polyimide (PI). However, this process requires a high graphitization temperature, typically from 2,700 to 3,200° C. An alternative method is to produce isolated/separated graphene sheets or nano graphene platelets (NGP) which are then stacked or packed to form a film. An NGP is essentially composed of a graphene plane (hexagonal lattice of carbon atoms) or multiple graphene planes stacked and bonded together (typically up to 10 graphene planes per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphene plane. A single-layer graphene is as thin as 0.34 nm.

Figure 1:
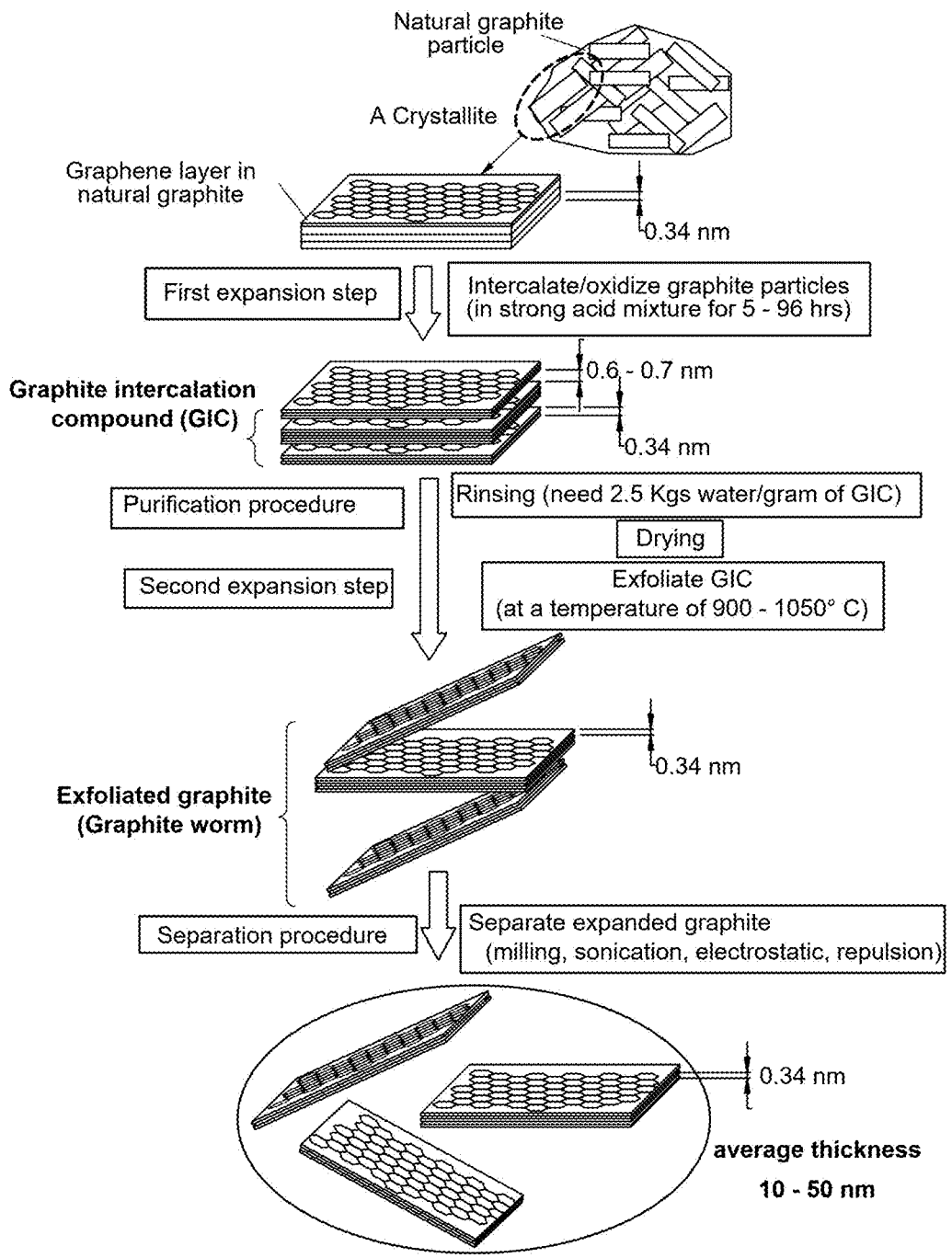
FIG. 1 A flow chart showing the most commonly used prior art process of producing highly oxidized graphene or graphene oxide.

Currently, the most commonly used method of graphene production is the so-called chemical method. As illustrated in FIG. 1, this method entails chemical intercalation or oxidation of natural graphite or synthetic graphite particles. These particles are essentially already in the fully graphitized state. Prior to intercalation or oxidation, the graphite particle has an inter-graphene plane spacing as small as approximately 0.335 nm ($L_d=½ d_{002}=0.335$ nm). Due to the short-range force nature of van der Waals forces, the bonding between graphene planes is very strong, making it difficult for any chemical species to intercalate into the inter-graphene spaces. Hence, it normally takes a combination of a strong acid (e.g. sulfuric acid) and a strong oxidant (e.g. potassium permanganate or nitric acid) and a long reaction time (4-96 hours) to achieve full chemical intercalation or oxidation of graphite to produce the graphite intercalation compound (GIC) or graphite oxide (GO). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water to produce graphene sheets. The resulting GO or RGO sheets are then coated, heat-treated, and compacted into a thin film. In order to achieve a combination of good electrical conductivity, high thermal conductivity, and good mechanical integrity, a final heat treatment temperature, typically as high as 2,700-3,200° C. is also required.

The present disclosure provides a new method of producing graphitic films from a combination of graphene oxide sheets (molecules) and molecules of a carbon/graphite precursor. The carbon/graphite precursor includes highly aromatic molecules or polycyclic aromatic hydrocarbons (PAH). This combination leads to unexpected synergistic effects. On the one hand, by dispersing GO sheets or molecules in a mass of PAH molecules, the GO molecules or sheets appear to be capable of serving as a nucleation sites for promoting rapid growth of PAH molecules into larger planar molecules. On the other hand, certain PAH molecules appear to be capable of serving as a cross-linking agent or chemical bridging agent that helps to bridge or merge neighboring GO sheets together to form a larger graphitic molecular or sheet-like structure of good structural integrity and exceptional thermal and electrical conductivity without having to go through the ultra-high graphitization temperature (e.g. 2,500-3,200° C.) as required in the production of graphitic film from GO alone, PAH alone, or PI films.

In certain embodiments, the disclosure provides a method of producing a graphitic film having a thickness from 2 nm to 5,000 μm (preferably from 10 nm to 500 μm and further preferably from 100 nm to 200 μm), the method comprising:

(a) providing a suspension of a mixture of GO and aromatic molecules (AM) dispersed or dissolved in a liquid medium, wherein the GO/AM weight ratio is from 1/100 to 100/1 and the aromatic molecules are selected from petroleum heavy oil or pitch, coal tar pitch, a polynuclear hydrocarbon, a halogenated variant thereof, or a combination thereof and wherein the aromatic molecules, containing a plane of hexagonal carbon atoms or fused aromatic rings, have an initial length or width from 5 nm to 1 μm; (b) dispensing and depositing the suspension onto a surface of a supporting substrate to form a wet layer of GO and aromatic molecules, wherein the dispensing and depositing procedure includes subjecting the suspension to an orientation-inducing stress or strain; (c) partially or completely removing the liquid medium from the wet layer to form a dried layer of GO-aromatic molecules mixture; and (d) heat treating the dried layer of aromatic molecules at a first temperature selected from 20° C. to 3,000° C. so that the GO and aromatic molecules are cross-linked, merged or fused (e.g. edge-to-edge) into larger graphene sheets or aromatic molecules, larger than the initial length or width, to form the graphitic film having graphene domains or graphite crystals, wherein the larger aromatic molecules or graphene planes in the graphene domains or graphite crystals are substantially parallel to each other.

Polynuclear hydrocarbons (also referred to as polycyclic aromatic hydrocarbons, PAHs, polyaromatic hydrocarbons, or polynuclear aromatic hydrocarbons) are hydrocarbons (organic compounds containing mostly carbon and hydrogen) that are essentially composed of multiple aromatic rings fused together (fused organic rings in which the electrons are delocalized). Prior to the first heat treatment, the starting PAHs contain mostly or substantially all fused rings (e.g. chlorinated anthracene). Although not preferred, the starting aromatic materials in the instant process may be selected from those containing isolated benzene rings that are connected by a linear chain or bond (e.g. 2'-chloro-1,1':4' 1"-terphenyl). Herein, PAHs include those having further branching substituents on these ring structures. The simplest of such chemicals are naphthalene, having two aromatic rings, and the three-ring compounds anthracene and phenanthrene. Briefly, examples of PAHs are halogenated and non-halogenated versions of naphthalene, anthracene, phenanthrene, tetracene, chrysene, triphenylene, pyrene, pentacene, benzo-pyrene, corannulene, benzo-perylene, coronene, ovalene, and benzo-fluorene. PAHs of interest here typically have from 2 to 20 aromatic rings (approximately 10 to 60 carbon atoms) fused together, more typically from 2 to 10 rings (approximately 10 to 32 carbon atoms). However, they can have a larger number of fused rings or fused polycyclic aromatics.

Petroleum- or coal-derived pitch is a mixture of larger polynuclear hydrocarbons with an average molecular weight of approximately 200 amu (approximately 180-200 carbon atoms or 60-66 rings). Each pitch product is a mixture of many different types and sizes of polynuclear hydrocarbons. There are also a variety of impurities (1-10% by weight) in such pitch materials. In contrast, those PAHs mentioned above are substantially impurity-free.

In some embodiments, the disclosed method begins with providing a suspension of both GO sheets (or molecules) and aromatic molecules dispersed or dissolved in a liquid medium, wherein the aromatic molecules are selected from petroleum heavy oil or pitch, coal tar pitch, a polynuclear hydrocarbon, a halogenated variant thereof, or a combination thereof. Then, the suspension is dispensed and deposited onto a surface of a supporting substrate (e.g. a plastic film/sheet, glass plate, stainless steel sheet, etc.) to form a wet layer of a mixture of GO and aromatic molecules, wherein the dispensing and depositing procedure includes subjecting the suspension to an orientation-inducing stress or strain to align the GO sheets and aromatic molecules substantially parallel to each other along a desired direction. This is followed by partially or completely removing the liquid medium from the wet layer to form a dried layer of GO/aromatic molecules.

Figure 2:
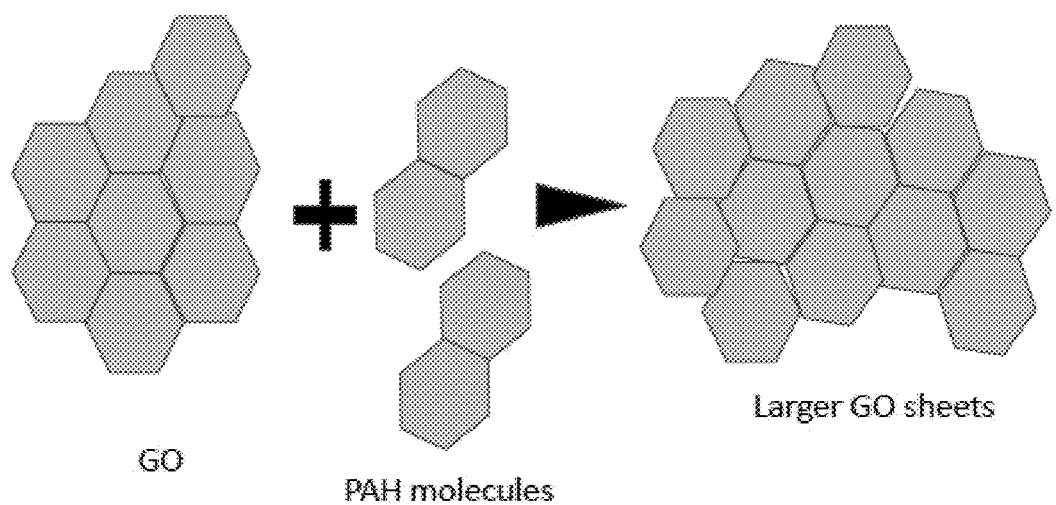
FIG. 2 Schematic drawing to illustrate chemical merging between a GO sheet (or molecule) and polycyclic aromatic hydrocarbon (PAH) molecules.

The method then includes a procedure of heat-treating the highly oriented (aligned) mixture of GO and polycyclic aromatic hydrocarbon (PAH) molecules or multiple pure PAHs at a first temperature selected from 20° C. to 3,000° C. (preferably from 25° C. to 500° C. and most preferably from 30° C. to 300° C.) to facilitate cross-linking, fusion or chemical merging of graphene oxide molecules and polycyclic aromatics to form larger (longer and/or wider GO/PAH). A schematic drawing is shown in FIG. 2 to illustrate possible chemical merging between a GO sheet (or molecule) and polycyclic aromatic hydrocarbon (PAH) molecules according to an embodiment of the present disclosure. This is for illustrating purpose only.

In certain embodiments, the larger, un-functionalized PAHs and/or GO molecules were subjected to a second heat treatment at a second heat treatment temperature (higher than the first temperature) selected from 300° C. to 3,200° C. (preferably from 300° C. to 1,500° C.). In some preferred embodiments, the heat treatments include a first heat treatment temperature preferably in the range from 30° C. to 300° C. for a heat treatment time of preferably 0.2 to 12 hours. This is followed by a second heat treatment at a second temperature from 300° C. to 1,500° C. for preferably 0.2 to 12 hours.

At a first heat treatment temperature of 20° C. to 150° C., certain chemically functionalized PAHs are capable of bridging or cross-linking adjacent GO molecules together. Examples of useful chemical functional groups attached to PAHs and/or GO that are capable of promoting cross-linking include, but are not limited to, 1-pyrenebutyrate (PB, a pyrene derivative), pyrene-1-sulfonic (PyS) acid, 3, 4, 9, 10-perylenetetracarboxylic diimide bis-benzenesulfonic (PDI) acid, polymers or long molecules with both ends terminated with phenyl, pyrene, or di-pyrene moieties. For instance, the latter polymers may be obtained from bis(1-pyrene methyl) docosa-10,12-diynedioate (BPDD, $C_{16}H_9CH_2OOC(CH_2)_8C\equiv C-C\equiv C(CH_2)_8COOCH_2C_{16}H_9$) monomers.

At a first heat treatment temperature of 150° C. to 300° C., the PAHs and GO molecules can undergo dehydrogenation polymerization that entails removal of non-carbon atoms, such as Cl, Br, H and N, and lateral merging of fused aromatic rings to form longer and wider aromatic molecules (GO or polyaromatic molecules) or more aromatic rings fused together in the length and width directions, much like growing polymer chains. Such a structure of fused aromatic rings can grow to contain up to 300 carbon atoms or approximately 100 rings fused together. Such a structure from fused PAH molecules is an incipient graphene sheet. Many of the growing PAH molecules are actually nucleated from or grown out of the edges of GO molecules. These growing graphene-like molecules can serve as a cross-linking agent that ties adjacent GO molecules or sheets together.

At a second heat treatment temperature selected from 300° C. to 1,500° C., these incipient graphene sheets continue to grow in lateral dimensions (length and width) which can reach several micrometers (0.5-100 μm and more typically 1-10 μm) and the resulting graphene sheets can each contain many thousands of fused rings. These dimensions and number of fused rings can be determined by using transmission electron microscopy (TEM) and atomic force microscopy (AFM).

As the polyaromatic molecules grow at a heat treatment temperature, the cohesive energy between polyaromatic molecules can eventually exceed the translational energy of individual polyaromatic molecules, resulting in the homogeneous nucleation of a new phase, called the mesophase. The polyaromatic molecules that constitute the mesophase are discotic, with one axis much smaller than the other two axes. These planar molecules can arrange themselves with the planes parallel to each other, forming nematic liquid crystals. Since these liquid crystals are substantially in a dried solid state and are highly aligned, continued heat treatments enable these liquid crystals, along with GO molecules, to grow in dimensions to eventually become graphene domains or graphite single crystals in a film or sheet form, avoiding the formation of meso-phase microbeads.

The aromatic molecules and/or GO molecules, prior to operation (a) or (b), may be preferably attached with some desired functional groups that facilitate or promote edge-to-edge chemical merging or linking between neighboring aromatic and/or GO molecules during operation (c) of heat-treating. For instance, functional group such as —OH, —COOH, —NH$_2$, and —C=O attached at the edges of aromatic molecules can promote merging between molecules.

In certain embodiments, the functional group may be selected from SO$_3$H, COOH, NH$_2$, OH, R'CHOH, CHO, CN, COCl, halide, COSH, SH, COOR', SR', SiR'$_3$, Si(—OR'—)$_y$R'$_{3-y}$, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of aromatic molecules using one of their ends and, during subsequent heat treatments, are able to react with proper functional groups from adjacent aromatic molecules.

The functional group may be selected from OY, NHY, O=C—OY, P=C—NR'Y, O=C—SY, O=C—Y, —CR'1-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N=CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

A properly programmed heat treatment procedure for heat treating the dried layer of highly oriented (aligned) aromatic molecules and GO can involve at least two heat treatment temperatures (first temperature for a period of time and then raised to a second temperature and maintained at this second temperature for another period of time), or any other combination of at least two heat treatment temperatures (HTT) that involve an initial treatment temperature (first temperature) and a final HTT, higher than the first.

The first heat treatment temperature is for chemical linking and thermal reduction of aligned polycyclic aromatic hydrocarbon (PAH) molecules and/or GO molecules and is conducted at the first temperature of preferably at least 20° C. (can be up to 1,000° C., but preferably up to 700° C., and most preferably up to 300° C.). This is herein referred to as Regime 1:

Regime 1 (from 20 to 300° C.): In this temperature range (the initial chemical linking and thermal reduction regime), chemical combination, polymerization (edge-to-edge merging), and cross-linking between adjacent PAH molecules and/or GO molecules begin to occur. Multiple PAH and/or GO molecules are packed and chemically bonded together side by side and edge to edge to form an integrated layer of graphene oxide-like entity. In addition, the layer of PAH and GO molecules primarily undergoes thermally-induced reduction reactions, leading to a reduction of oxygen content to approximately 5% or lower. This treatment results in a reduction of inter-graphene spacing from approximately 0.8-1.2 nm (as dried) down to approximately 0.4 nm, and an increase in in-plane thermal conductivity from approximately 100 W/mK to 500 W/mK (if PAH molecules alone or GO sheets alone are heat-treated). Quite surprisingly, when both GO and PAH molecules are mixed and the resulting oriented mixture is heat-treated, the in in-plane thermal conductivity of the resulting graphitic film is found to be typically from approximately 300 W/mK to 850 W/mK. This is an unexpected synergistic effect.

Even with such a low temperature range, some chemical linking between PAH molecules occurs. The PAH molecules remain well-aligned, but the inter-graphene plane spacing remains relatively large (0.4 nm or larger). Many 0-containing functional groups survive.

The highest or final HTT that the GO mass experiences may be divided into three distinct HTT regimes:

Regime 2 (300° C.-1,500° C.): In this mainly chemical linking regime, additional thermal reduction and extensive chemical combination, polymerization, and cross-linking between adjacent PAH molecules and/or GO molecules (sheets) occur. The oxygen and other non-carbon content is reduced to typically below 1% after chemical linking, resulting in a reduction of inter-graphene spacing to approximately 0.35 nm. This implies that some initial graphitization has already begun at such a low temperature, in stark contrast to conventional graphitizable materials (such as carbonized polyimide film) that typically require a temperature as high as 2,500° C. to initiate graphitization. This is another distinct feature of the presently invented graphitic film and its production processes. These chemical linking reactions result in an increase in in-plane thermal conductivity to 850-1,350 W/mK, and/or in-plane electrical conductivity to 3,500-4,500 S/cm.

Regime 3 (1,500-2,500° C.): In this ordering and re-graphitization regime, extensive graphitization or graphene plane merging occurs, leading to significantly improved degree of structural ordering. As a result, the oxygen content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in in-plane thermal conductivity to >1,350-1,500 W/mK, and/or in-plane electrical conductivity to 5,000-8,000 S/cm.

Regime 4 (higher than 2,500° C.): In this re-crystallization and perfection regime, extensive movement and elimination of grain boundaries and other defects occur, resulting in the formation of nearly perfect single crystals or poly-crystalline graphene crystals with huge grains, which can be orders of magnitude larger than the original grain sizes of the starting PAH molecules. The oxygen content is essentially eliminated, typically 0.01%-0.1%. The inter-graphene spacing is reduced to down to approximately 0.3354 nm (degree of graphitization from 80% to nearly 100%), corresponding to that of a perfect graphite single crystal. Quite interestingly, the graphene domain has all the graphene planes being closely packed and bonded, and all the planes are aligned along one direction, a perfect orientation. Such a perfectly oriented structure has not been produced even with the highly oriented pyrolytic graphite that was produced by subjecting pyrolytic graphite concurrently to an ultra-high temperature (3,400° C.) under an ultra-high pressure (300 Kg/cm$^2$). The highly oriented graphene structure can achieve such a highest degree of perfection with a significantly lower temperature and an ambient (or slightly higher compression) pressure. The structure thus obtained exhibits an in-plane thermal conductivity from 1,600 up to >1,700 W/mK, and in-plane electrical conductivity to a range from 15,000 to 20,000 S/cm.

The presently invented highly oriented GO/PAH-derived structure can be obtained by heat-treating the dried layer of aligned GO/PAH molecules with a temperature program that covers at least the first regime (typically requiring 1-24 hours in this temperature range), more commonly covers the first two regimes (1-10 hours preferred), still more commonly the first three regimes (preferably 0.5-5 hours in Regime 3), and most commonly all the 4 regimes (Regime 4, for 0.5 to 2 hour, may be implemented to achieve the highest conductivity).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The graphitic film having a $d_{002}$ higher than 0.3440 nm reflects the presence of oxygen-containing functional groups (such as —OH, >O, and —COOH on graphene-like plane surfaces) that act as a spacer to increase the inter-graphene spacing.

Another structural index that can be used to characterize the degree of ordering of the presently invented oriented PAH-derived graphitic film and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our oriented PAH-derived graphitic samples have a mosaic spread value in this range of 0.2-0.4 (if produced with a heat treatment temperature (HTT) no less than 2,500° C.). However, some values are in the range from 0.4-0.7 if the HTT is between 1,500 and 2,500° C., and in the range from 0.7-1.0 if the HTT is between 300 and 1,500° C.

The following examples serve to provide the best modes of practice for the presently disclosed process and should not be construed as limiting the scope of the process:

Example 1: Preparation of Single-Layer Graphene Sheets and the Graphene Layer from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected to ultra-sonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

Example 2: Preparation of Graphene Oxide (GO) Using a Modified Hummers' Method Graphite oxide was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately 4 hours at 35° C. to fully oxidize graphite. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry, containing graphite oxide dispersed in water, was then subjected to for ultrasonication for 1 hour to obtain graphene oxide sheets or molecules dispersed in water. Upon removal of water, the suspension became powder of graphene oxide sheets.

Example 3: Graphitic Films from Mixtures of go and Naphthalene or Chlorinated Naphthalene Several samples of graphitic films were prepared from naphthalene alone, a mixture of naphthalene and GO, chlorinated naphthalene (2,3,6,7-Tetrachloronaphthalene) alone, a mixture of chlorinated naphthalene and GO, and GO sheets alone. Graphitic films were produced from heat treated, highly oriented naphthalene, chlorinated naphthalene molecules, and their mixtures with GO by executing the following procedure (using chlorinated naphthalene as an example): (a) pouring a mass of chlorinated naphthalene (5 g), chlorophenylene (5 g), and 0.1 g of PdCl$_2$ catalyst into a stainless steel reactor (5 gallon size); (b) heating the reactor from 25° C. to 150° C. at a rate of 2 degrees per minute and subsequently maintaining the temperature at 150° C. for 4 hours to obtain suspension of larger polycyclic aromatic molecules; (c) ultrasonic-spraying the suspension onto a glass substrate surface and vaporizing the liquid component of the suspension to obtain a dried layer of highly oriented polycyclic aromatic molecules; (d) heat-treating these oriented molecules on glass surface at a temperature of 800° C. for 2 hours to obtain carbon films, which were then further supported by a graphite plate and heat-treated at 2,800° C. for 2 hours to obtain graphitic films.

Figure 3:
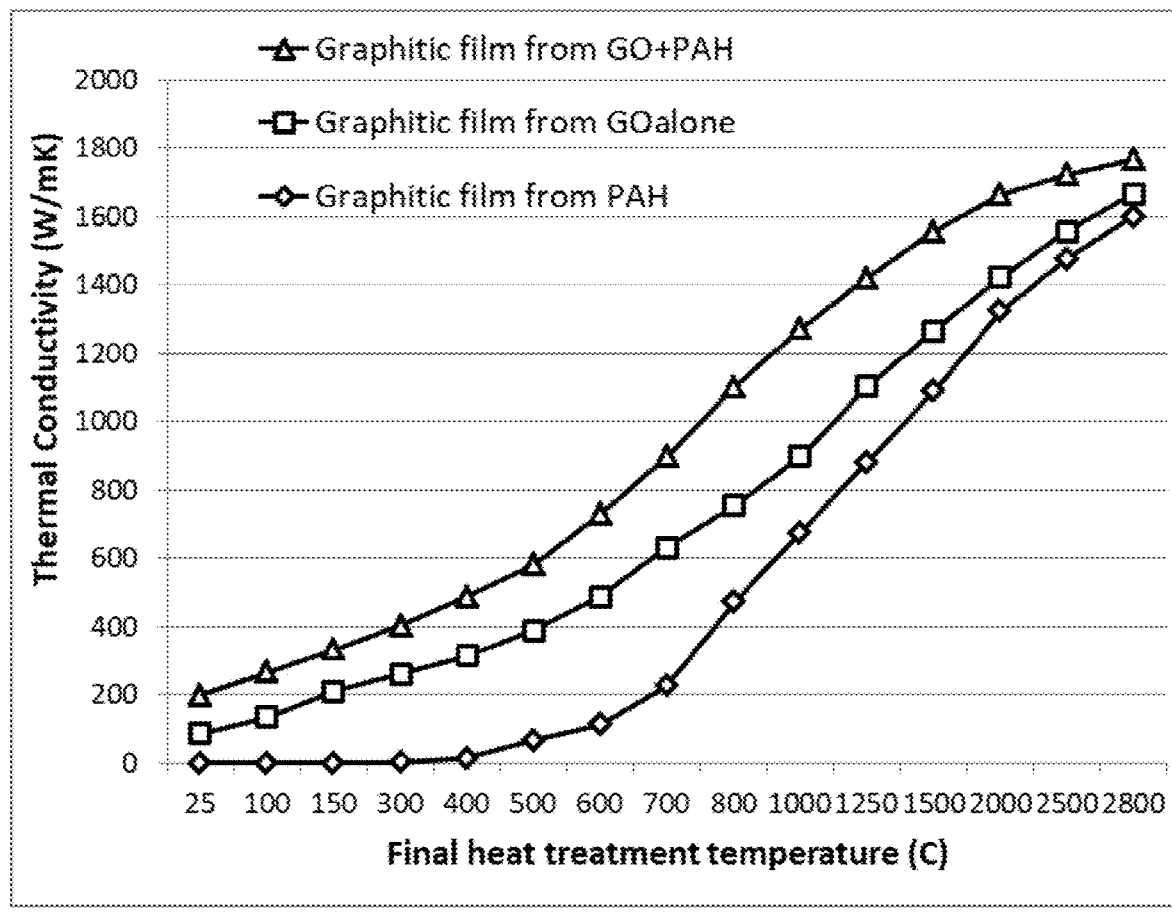
FIG. 3 The thermal conductivity values of graphitic films obtained from a mixture of naphthalene and GO, GO alone, and naphthalene alone, respectively, all plotted as a function of the final heat treatment temperatures of the oriented aromatic/GO molecules.

Shown in FIG. 3 are the thermal conductivity values of graphitic films obtained from a mixture of naphthalene and GO, GO alone, and naphthalene alone, respectively, all plotted as a function of the final heat treatment temperatures of the oriented aromatic/GO molecules. As one can easily see, presently disclosed graphitic films produced from a mixture of GO and PAH molecules exhibit the highest thermal conductivity given the same heat treatment conditions. It is of significance to point out that a thermal conductivity as high as 1,100 W/mK can be achieved with a heat treatment temperature of 800° C.

Example 4: Functionalized Carbon Films and Graphitic Films from Mixtures of go with Anthracene or Halogenated Anthracene A mass (10 grams) of anthracene and brominated anthracene, respectively, was added into a stainless steel reactor, which was heated from 25° C. to a temperature of 145° C. and subsequently maintained at the same temperature for 3 hours. On a separate basis for each starting material, 2'-chloro-1,1':4',1''-terphenyl was added into a stainless steel reactor, which was heated from 25° C. to a temperature of 145° C. and subsequently maintained at the same temperature for 12 hours in the presence of a catalyst, PdCl$_2$. Both procedures led to the formation of larger polycyclic hydrocarbons.

Subsequently, diethylenetriamine (DETA) was added separately into both reactors and the material mixture was processed at 350° C. for an additional 2 hours to obtain amine-functionalized aromatic carbon planes well dispersed in a disordered matrix of hydrocarbon molecules and solvent. Such a suspension was cooled down to below 100° C. and coated, using a slot-die coater, onto a roll of plastic sheet (PET film). The coated material was dried and separated from the plastic film. The dried, highly oriented functionalized aromatic molecules were subjected to a heat treatment temperature at 1,500° C. for 2 hours to obtain graphitic films.

In separate experiments, the following functional group-containing species were separately introduced to the aromatic mass being heat-treated at up to 350° C.: an amino acid, sulfonate group (—SO$_3$H), 2-Azidoethanol, polyamide (caprolactam), and aldehydic group. In general, these functional groups were found to promote or facilitate edge-to-edge chemical merging and some edge-to-plane linking between aromatic molecules that grow into highly graphitic structure having large graphite single crystals that are highly oriented. The final heat treatment temperature was typically from 700 to 3,200° C.

Figure 4:
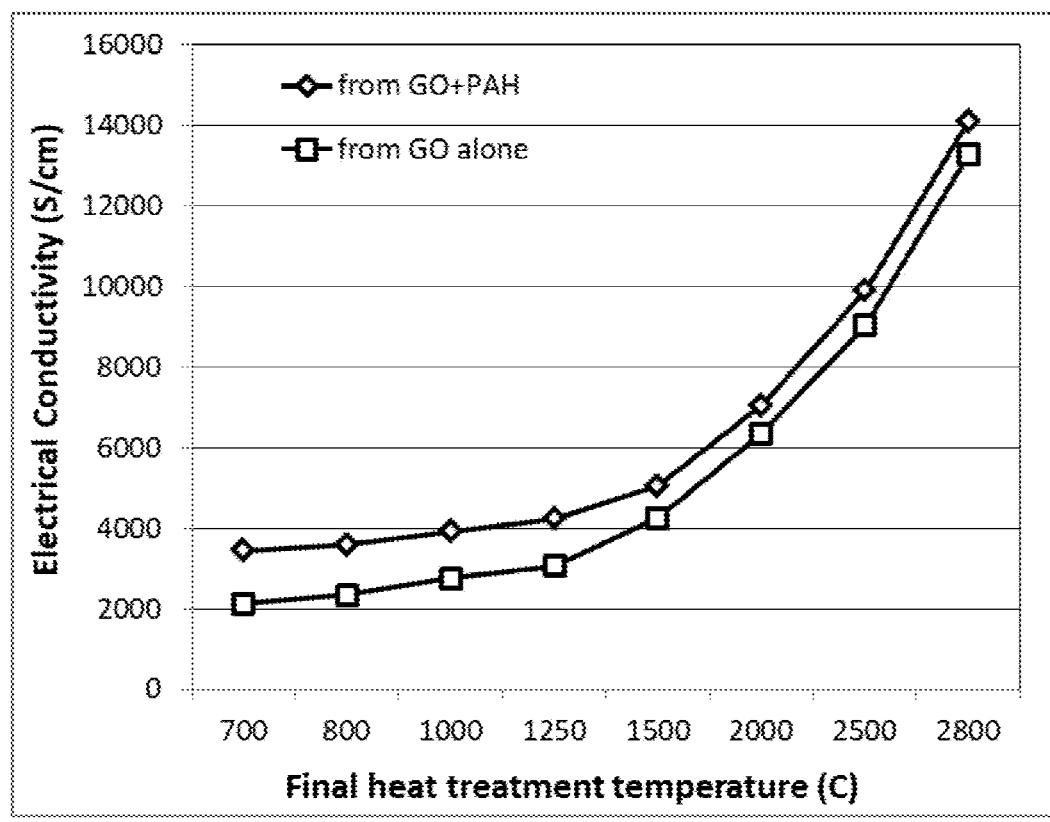
FIG. 4 Electrical conductivity values of graphitic films obtained from a mixture of halogenated anthracene and GO and those of GO alone, respectively, all plotted as a function of the final heat treatment temperatures of the oriented aromatic/GO molecules.

FIG. 4 shows the electrical conductivity values of graphitic films obtained from a mixture of halogenated anthracene and GO and those of GO alone, all plotted as a function of the final heat treatment temperatures of the oriented aromatic/GO molecules. Again, compared to the approach of using GO alone, the GO/PAH mixtures led to higher electrical conductivities given the same heat treatment temperatures.

Example 5: Graphitic Films from Mixtures of Oriented GO and 1-Aminopyrene-Based Polycyclic Aromatic Hydrocarbon Molecules The starting materials, 1-aminopyrene (AP) and disuccinimidyl suberate (DSS) were purchased from Sigma-Aldrich. The AP and DSS were dissolved in DMF solution with four different concentrations of 3 mM, 6 mM, 12 mM, and 18 mM, respectively, and then stirred for 12 h to form a new molecule of AP-DSS through amido linkage. The chemical formula of AP-DSS is given below:

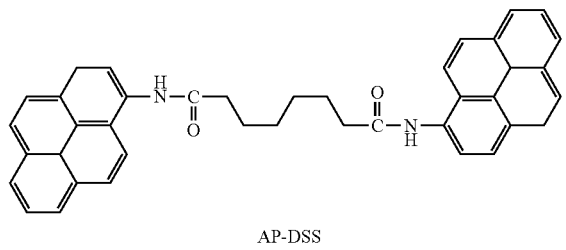 [SMILES: O=C(CCCCCCC(=O)Nc1ccc2c3c1C=CC1=CC=CC(=CC2)C13)NC1=CCC2=CC=C3C=CC=C4C=CC1=C2C43]

AP-DSS

The needed GO was prepared in Example 4 by a modified Hummer's method.

As a baseline material for comparison purposes, GO film was fabricated by the vacuum filtration of the GO dispersions (0.9 mg/mL). After the obtained GO film was chemically reduced by HI for 5 h and subsequent washed by absolute ethyl alcohol several times, the rGO film was soaked in the above AP-DSS in DMF solution with different concentrations for 24 hours. Subsequently, the fabricated rGO-AP-DSS films were purified by DMF five times and re-cast on a glass surface and vacuum-dried overnight. The electrical conductivity values of these films were found to be from 420 S/cm to 445 S/cm.

Separately, several mixtures of rGO and AP-DSS were prepared by adding rGO molecules into the AP-DSS/DMF solution to obtain samples of slurries (rGO-to-AP/DSS ratios=40/60, 70/30, and 85/15). The slurries were respectively were then slot die-coated on a stainless steel sheet surface under a high shear condition to form wet layers, which were allowed to complete reactions at room temperature for 24 hours, and dried to obtain graphitic films. The electrical conductivity values of these films were found to be from 1,250 S/cm to 2,540 S/cm. These data have demonstrated that a high electrical conductivity>2,500 S/cm can be achieved with a thermal film obtained at a processing temperature as low as 20° C.

Example 6: Graphitic Films from Other Oriented Mixtures of GO and Polycyclic Aromatic Hydrocarbon Molecules Various PAHs were used as a starting material for producing graphitic films through the presently disclosed method. The representative processing conditions are summarized in Table 1 below:

TABLE 1

Representative processing conditions and some salient features of products
(Cl- means chlorinated; Br- means brominated; F- means fluorinated.

| Sample ID | GO and/or aromatic molecules | $1^{st}$ heat treatment and catalyst (if any) | $2^{nd}$ heat treatment | Coating/aligning method |
|---|---|---|---|---|
| Ph-1 | GO + Chlorinated Phenanthrene | 150° C. 2 h | 600° C., 3 h | Ultrasonic spraying |
| Ph-2 | GO + Phenanthrene | 150° C. 2 h (PdCl$_2$) + 300° C. 3 h | 1,500° C. | Comma coating |
| Ph-3 | Chlorinated Phenanthrene | 150° C. 2 h | 2,800° C., 3 h | Ultrasonic spraying |
| Tc-1 | GO + Tetracene | 125° C. 2 h (FeCl$_3$) + 300° C. 3 h | 900° C., 3 h | Slot-die coating |
| Tc-2 | Br-Tetracene | 125° C. 2 h + 300° C. 3 h | 2900° C. 1 h | Slot-die coating |
| Py-1 | Pyrene + GO | 150° C. 5 h (PdCl$_2$) + functionalization | 1500° C., 3 h | Ultrasonic spraying |
| Py-2 | Cl-Pyrene + GO | 150° C. 3 h (PdCl$_2$) | 900° C., 3 h | Ultrasonic spraying |
| Cn-1 | Coronene + GO | 350° C. 3 h | 1500° C. 2 h | Comma coating |
| Cn-2 | Cl-Coronene | 350° C. 3 h | 1500° C. 2 h | |
| PP-1 | Petroleum pitch | 300° C. 2 h + 1000° C. 2 h | 2500° C. 1 h | Comma coating |
| PP-2 | Petroleum pitch + GO | 300° C. 2 h + 1000° C. 2 h | 1250° C. 3 h | Comma coating |
| CP-1 | Coal tar pitch | 350° C. 2 h (FeCl$_3$) | 900° C. 3 h | Comma coating |
| CP-2 | Coal tar pitch + GO | 350° C. 2 h (FeCl$_3$) | None | Comma coating |
| Tp + An-1 | Cl-triphenylene + F-anthracene + GO | 300° C. 2 h | 1,500° C. 2 h | Slot-die coating |
| Tp − An-2 | Ci-triphenylene + F-anthracene | 300° C. 2 h | 2850° C. 2 h | Slot-die coating |

These data indicate that, upon completion of the first heat treatment, the longer/wider GO or aromatic molecules can be further increased in length and width if the material is subjected to a second heat treatment at a higher temperature. Halogenation, along with some catalyst, can promote ring-fusing of polycyclic aromatic molecules to form larger aromatic molecules that are essentially incipient graphene molecules. However, the co-existence of both GO and PAH molecules, typically requires a lower second heat treatment temperature and in many cases does not require a second heat treatment to achieve good electrical and thermal conductivities.

All the PAHs herein investigated (e.g. halogenated and un-halogenated versions of naphthalene, anthracene, phenanthrene, tetracene, chrysene, triphenylene, pyrene, pentacene, benzo-pyrene, corannulene, benzo-perylene, coronene, ovalene, and benzo-fluorene) can be methylated, aminated (derivatized with amine), hydroxylated, etc. to obtain derivatives having a substituent on a ring structure thereof. All the derivatives of these PAHs can be used as a starting material for practicing instant disclosed process to produce graphitic films.

As an example of the derivative of a PAH, chemical oxidation of anthracene occurs readily in the presence of, for example, hydrogen peroxide and vanadyl acetylacetonate, giving anthraquinone, $C_{14}H_8O_2$, shown below:

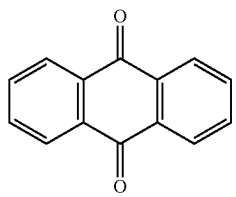 [SMILES: O=C1c2ccccc2C(=O)c2ccccc21]

These two O atoms are highly active and can readily react with a broad array of chemical species, such as those selected from —SO$_3$H, —COOH, —NH$_2$, —OH, —R'CHOH, —CHO, —CN, —COCl, halide, —COSH, —SH, —COOR', —SW, —SiR'$_3$, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate. Essentially, all the derivatives of PAHs can be used as a starting material for the production of graphitic films using the presently disclosed method.

The invention claimed is:

1. A method of producing a graphitic film having a thickness from 2 nm to 5,000,000 nm, said method comprising:
   A) providing a suspension of both graphene oxide and aromatic molecules dispersed or dissolved in a liquid medium, wherein a graphene oxide-to-aromatic molecule weight ratio is from 1/100 to 100/1 and said aromatic molecules are selected from petroleum heavy oil or pitch, coal tar pitch, a polynuclear hydrocarbon, a halogenated version thereof, or a combination thereof and wherein both said graphene oxide and said aromatic molecules contain a plane of hexagonal carbon atoms or fused aromatic rings, wherein either said graphene oxide or said aromatic molecules are attached with a chemical functional group selected from 1-pyrenebutyrate, pyrene-1-sulfonic acid, 3, 4, 9, 10-perylenetetracarboxylic diimide bis-benzenesulfonic acid, a polymer or molecule with both ends terminated with phenyl, pyrene, or di-pyrene moieties, or a combination thereof;
   B) dispensing and depositing said suspension onto a surface of a supporting solid substrate to form a wet layer of graphene oxide and aromatic molecules, wherein said dispensing and depositing procedure includes subjecting said suspension to an orientation-inducing stress or strain;
   C) partially or completely removing said liquid medium from the wet layer to form a dried layer of graphene oxide and aromatic molecules; and
   D) heat treating said dried layer of aromatic molecules at a first temperature selected from 20° C. to 3,000° C. so that said graphene oxide and aromatic molecules are cross-linked, merged or fused together to form said graphitic film comprising larger graphene sheets or graphene planes that are substantially parallel to each other.

2. The method of claim 1, wherein said graphene oxide comprises an oxygen content from 2% to 50% by weight of the total graphene oxide weight.

3. The method of claim 1, wherein said graphitic film comprises graphene domains or graphite crystals having a length or width from 10 nm to 10 μm or an inter-graphene spacing from 0.34 nm to 2.2 nm.

4. The method of claim 1, wherein said aromatic molecules or graphene oxide sheets in operation (A) are chemically functionalized with a functional group selected from —OH, —COOH, —NH$_2$, —C═O, or a combination thereof.

5. The method of claim 1, wherein either said graphene oxide or said aromatic molecules in operation (A) are attached with a chemical functional group selected from alkyl or aryl silane, alkyl or aralkyl group, hydroxyl group, carboxyl group, amine group, sulfonate group (—SO$_3$H), aldehydic group, quinoidal, fluorocarbon, or a combination thereof.

6. The method of claim 1, wherein either said graphene oxide or said aromatic molecules in operation (A) are attached with a chemical functional group, which is an azide compound selected from the group consisting of 2-azido-ethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

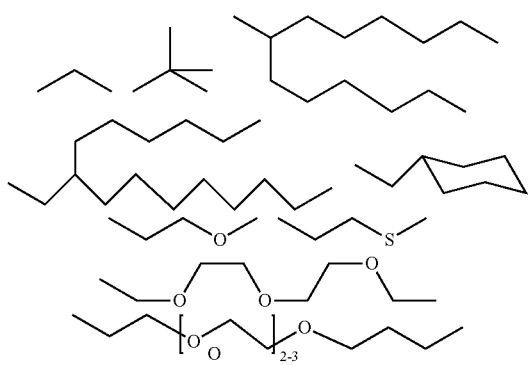

-continued

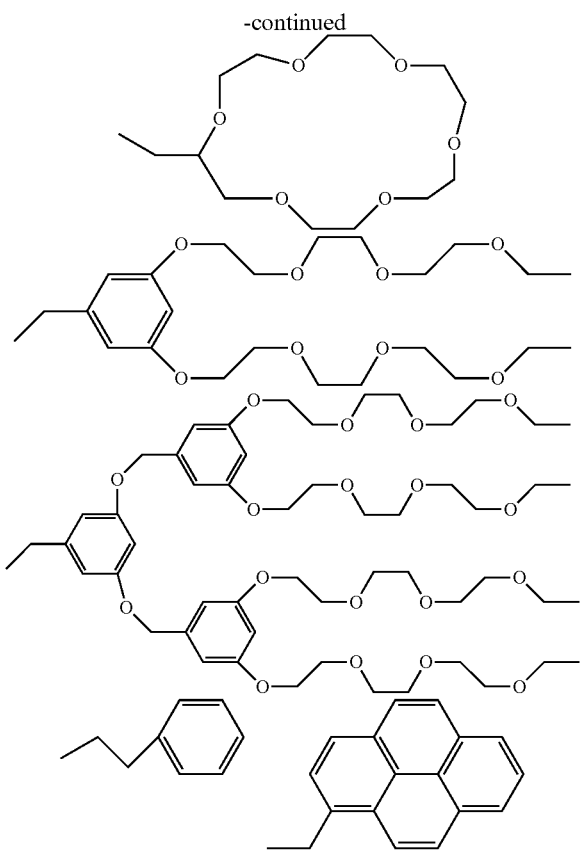

and combinations thereof.

7. The method of claim 1, wherein said aromatic molecules in operation (A) are attached with a chemical functional group containing an oxygenated group selected from the hydroxyl, peroxide, ether, keto, aldehyde, or a combination thereof.

8. The method of claim 1, wherein either said graphene oxide or said aromatic molecules in operation (A) are attached with a chemical functional group selected from $SO_3H$, COOH, $NH_2$, OH, R'CHOH, CHO, CN, COCl, halide, COSH, SH, COOR', SR', $SiR'_3$, $Si(-OR'-)_yR'_{3-y}$, $Si(-O-SiR'_2-)OR'$, R", Li, $AlR'_2$, Hg—X, $TiZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, or a combination thereof.

9. The method of claim 1, wherein either said graphene oxide or said aromatic molecules in operation (A) are attached with a chemical functional group selected from amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, an acrylonitrile chain, polyfurfuryl alcohol, phenolic resin, or a combination thereof; and/or said functional group is selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X, R'SiR'$_3$, R'Si(—OR'—)$_y$R'$_{3-y}$, R'Si(—O—SiR'$_2$—)OR', R'—R", R'—N—CO, $(C_2H_4O—)_wH$, $(—C_3H_6O—)_wH$, $(—C_2H_4O)_w—R'$, $(C_3H_6O)_w—R'$, R', and w is an integer greater than one and less than 200.

10. The method of claim 1, further comprising compressing said graphitic film to produce a conducting graphitic film having a physical density no less than 1.6 g/cm$^3$.

11. The method of claim 1, wherein said operation (D) of heat treating said dried layer is conducted while a compressive stress is imposed on said dried layer.

12. The method of claim 1, wherein said liquid medium contains a non-aqueous solvent selected from polyethylene glycol, ethylene glycol, propylene glycol, an alcohol, a sugar alcohol, a polyglycerol, a glycol ether, an amine based solvent, an amide based solvent, an alkylene carbonate, an organic acid, or an inorganic acid.

13. The method of claim 1, wherein said graphitic film has a thickness from 10 nm to 500,000 nm.

14. The method of claim 1, wherein said operations (B), (C) and (D) are conducted in a roll-to-roll manner.

15. The method of claim 1, wherein said first heat treatment temperature contains a temperature in the range from 20° C.-1,500° ° C. and the graphitic film has an oxygen content less than 2.0%, an inter-planar spacing less than 0.36 nm, a physical density no less than 1.5 g/cm$^3$, a thermal conductivity of at least 700 W/mK, and/or an electrical conductivity no less than 1,300 S/cm.

16. The method of claim 1, wherein said first heat treatment temperature contains a temperature in the range from 1,500° ° C.-2,100° C. and the graphitic film has an oxygen content less than 1.0%, an inter-planar spacing less than 0.345 nm, a thermal conductivity of at least 1,000 W/mK, and/or an electrical conductivity no less than 5,000 S/cm.

17. The method of claim 1, wherein said first heat treatment temperature contains a temperature greater than 2,100° C. and the graphitic film has an oxygen content no greater than 0.1%, an inter-graphene spacing less than 0.340 nm, a mosaic spread value no greater than 0.7, a thermal conductivity of at least 1,300 W/mK, and/or an electrical conductivity no less than 8,000 S/cm.

18. The method of claim 1, wherein said first heat treatment temperature contains a temperature no less than 2,500° C. and the graphitic film has an inter-graphene spacing less than 0.336 nm, a mosaic spread value no greater than 0.4, a thermal conductivity greater than 1,600 W/mK, and/or an electrical conductivity greater than 10,000 S/cm.

* * * * *